United States Patent [19]

Gary et al.

[11] 4,288,880
[45] Sep. 15, 1981

[54] BEE VACUUM DEVICE AND METHOD OF HANDLING BEES

[75] Inventors: Norman E. Gary; Kenneth Lorenzen, both of Davis, Calif.

[73] Assignee: The Regents of the University of California, Berkeley, Calif.

[21] Appl. No.: 93,587

[22] Filed: Nov. 13, 1979

[51] Int. Cl.³ .................. A01K 51/00; A01K 57/00
[52] U.S. Cl. ............................................. 6/12 R; 6/7; 43/139
[58] Field of Search ............ 6/1, 4 A, 7, 12 M, 12 R; 43/139

[56] References Cited

U.S. PATENT DOCUMENTS 1,982,419 11/1934 Chrysler .................................. 6/4 A
2,829,384 4/1958 Studler ............................. 6/12 R X

FOREIGN PATENT DOCUMENTS 910258 6/1946 France ................................ 6/12 R
51688 8/1966 Poland ................................. 6/12 R Primary Examiner—Gene Mancene
Assistant Examiner—Robert P. Swiatek
Attorney, Agent, or Firm—Lothrop & West

[57] ABSTRACT

A bee handling device and method for removing worker, drone and queen bees from a comb includes a chamber having an entrance opening of a size to pass a comb frame and attendant bees. The chamber is subjected to vacuum drawing in air currents flowing across bees and the comb frame and into the chamber. Brushes line the entrance opening and aid in simultaneously brushing bees from the comb frame for capture within the chamber. After being deprived of bees, the combs are withdrawn from the chamber. Bees are temporarily retained in the chamber until transferred to another chamber which has an exit screen that passes worker bees while retaining queen and drone bees thereby partitioning the castes for separate and further handling.

4 Claims, 14 Drawing Figures

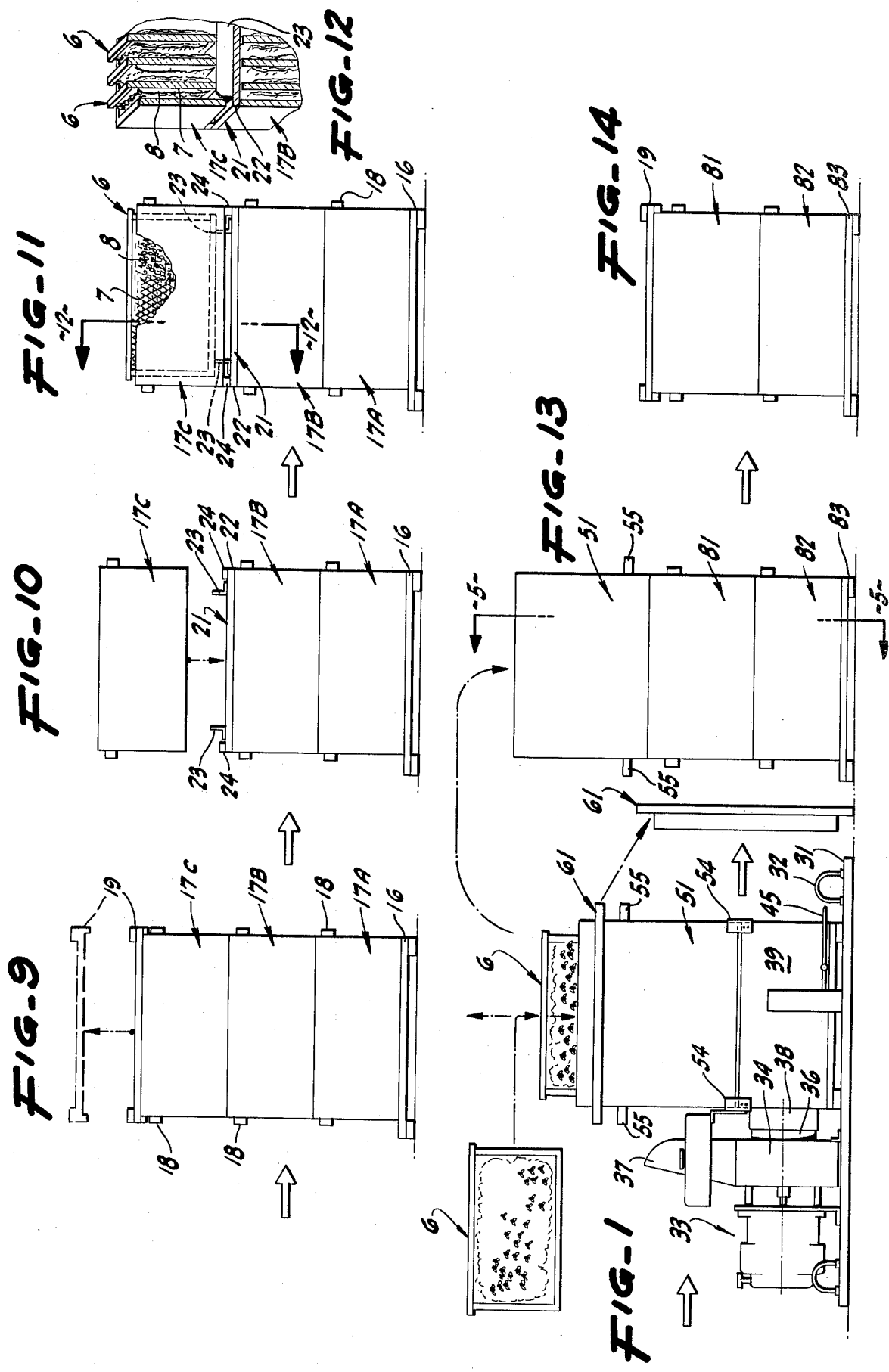

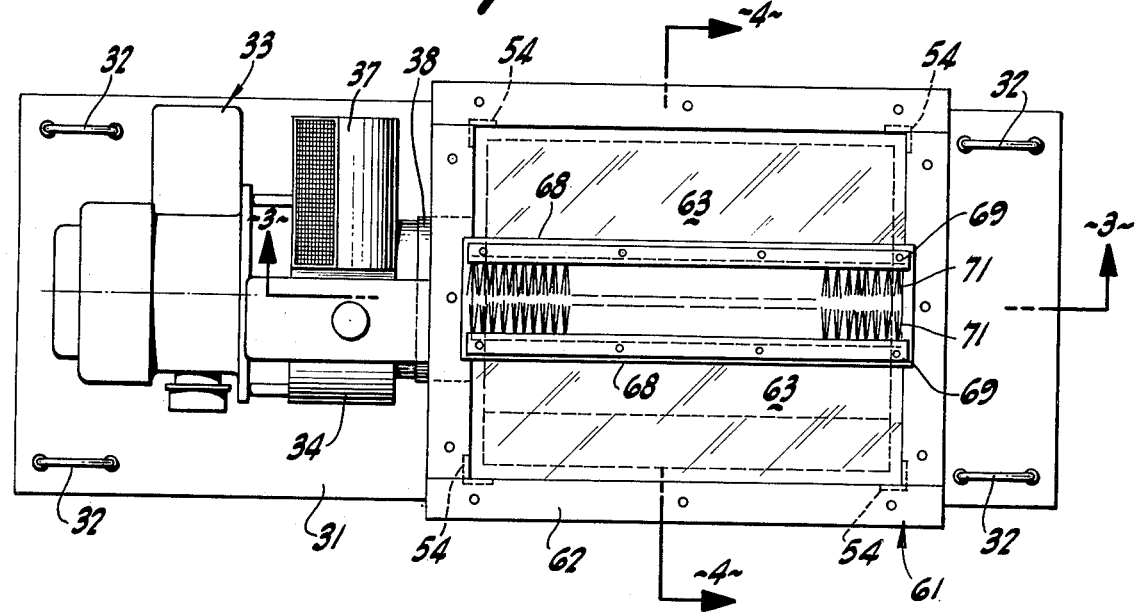
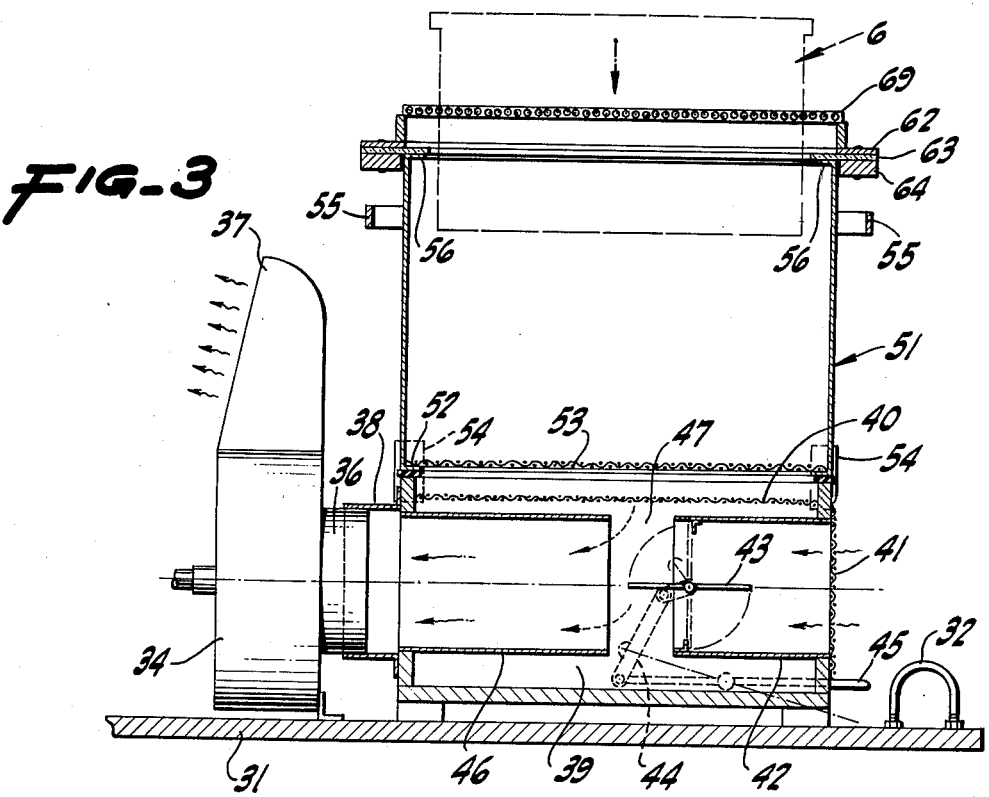

BEE VACUUM DEVICE AND METHOD OF HANDLING BEES

BRIEF SUMMARY OF THE INVENTION

A comb frame containing honey, pollen, and/or brood, and covered with bees, is first brushed in a current of air flowing toward a vacuum chamber in which the separated bees are then temporarily retained. The comb frame or comb, then devoid of bees, is then handled separately from the so-separated bees. Those separated bees may then be disposed of or screened physically to separate the worker bees from the queen and drone bees by size. The screened or filtered workers may be transferred to the same or other combs for repetitive use, or otherwise disposed of, and the queens and drones are otherwise disposed of.

BRIEF DESCRIPTION OF THE SEVERAL VIEWS OF THE DRAWINGS

FIG. 1 is a side elevation of the vacuum portion of some of the mechanism utilized in connection with the separation of the bees.

FIG. 2 is a plan, to a somewhat larger scale, of the structure shown in FIG. 1.

FIG. 3 is a cross-section, the plane of which is indicated by the line 3—3 of FIG. 2.

FIG. 9 is a side elevation of a stack of enclosures.

FIG. 10 is a side elevation of the stack of chambers of FIG. 9 and including the ejecting mechanism of FIG. 8.

FIG. 11 is a side elevation similar to FIGS. 9 and 10 and with a portion broken away and showing the ejector and the combs partially ejected from a chamber.

FIG. 12 is a fragmentary view in iosmetric perspective showing a plurality of partially ejected combs in a broken away chamber.

FIG. 13 is a stack of chambers of different sorts as they appear in a late stage of the process disclosed herein.

FIG. 14 is a view comparable to FIG. 13 but showing the equipment in a final stage.

DETAILED DESCRIPTION

Figure 6:
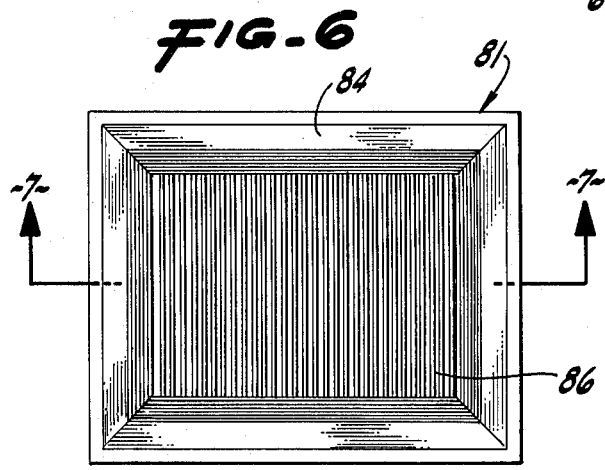
FIG. 6 is a plan of an enclosure and filter chamber.
Figure 7:
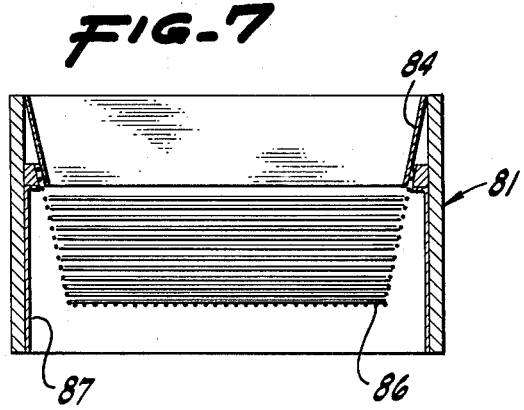
FIG. 7 is a cross-section, the plane of which is indicated by the line 7—7 of FIG. 6.

In the cultivation of honeybees, it is customary to furnish (FIGS. 1 and 11) a plurality of standardized frames 6 in which homeycomb 7 is provided and in which a supply of honey 8 accumulates after a period of time due to the agency of worker bees and queen bees and also with some measure of drone bees.

In the customary operation, there is provided in a convenient field location a suitable bottom board 16 (FIG. 9) on which is assembled a number of appropriate chambers 17A, 17B and 17C. These are at least four-sided boxes sometimes having cleat handles 18 and are usually without bottom boards or top covers directly fastened or connected thereto. It is usual to have a stack, as shown in FIG. 9, of, say, one or more of such containers normally closed at the top by a removable cover 19. There is adequate access from the outside to the interior of the containers 17 so that the bees in the course of their regular foraging activities import nectar that is transformed into honey that is deposited in the combs 7 disposed primarily in the containers 17B and 17C substantially as shown in FIGS. 11 and 12. Normally, a plurality of vertical comb frames 6 extend transversely of the box, with the comb frames therein somewhat spaced apart and thus supplying appropriate sites for the deposit of honey, rearing of brood, and clustering of bees, the containers affording free access in both coming and going directions to the multitude of bees. Brood tends to occupy the majority of combs in the lower chambers, and honey tends to be stored in combs in the upper chambers.

Figure 8:
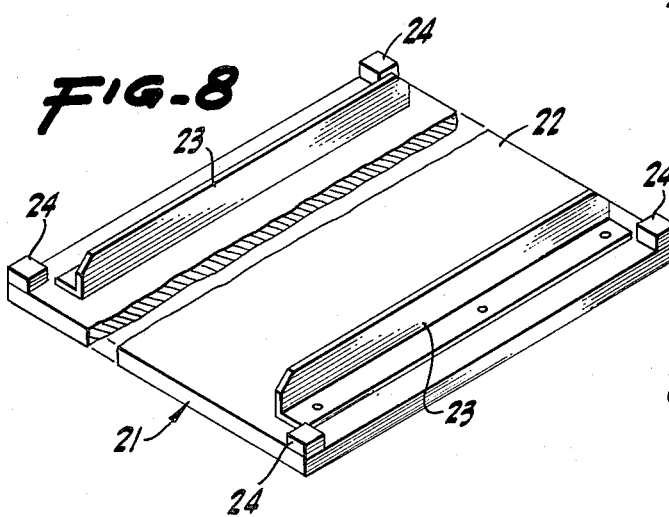
FIG. 8 is an isometric perspective of an ejector device, portions being broken away.

In certain operations, there is the necessity for separating the bees from the frame combs. For example, when combs in the upper chamber 17C are substantially filled with honey and it is desired to recover the honey, the arrangement is initially changed from that of FIG. 9 to that substantially as shown in FIG. 10. For example, if the uppermost chamber 17C is to be worked on, then that chamber is lifted from the compact stack as shown in FIG. 9. There is then deposited on the next lower chamber 17B, in that stack or in a similar stack or on a similar supporting base, a particular dislodging device 21, as shown in FIG. 8.

This dislodging device 21 is primarily a rectangular plate 22 or board having a pair of upstanding, parallel angle irons 23 secured to and projecting well to one side thereof, and oriented such that the angle irons contact simultaneously all comb frame bottoms of a comb chamber. In addition, the board 22 is provided at each corner with a block 24. This, however, is not quite as high as the angle irons 23. In use, the device 21, as shown in FIG. 10, may be employed on any suitable base or on the top of the second chamber 17B after the first chamber 17C has been lifted therefrom. Thereupon, the first chamber 17C is redirected toward its initial position and eventually rests on the blocks 24. In the meantime, the angle irons contact and displace upwardly all of the bottom-exposed comb frames 6 together with their accompanying bees.

The attendant not only places the uppermost chamber 17C into position so that the comb frames 6 are dislodged, but to do so may have to supply downward force on the chamber. Sometimes the various comb frames 6 stick or adhere in their chamber and so require substantial dislodgment. In any case, when the disposition of the uppermost chamber 17C onto the blocks 24 has been completed, the various comb frames 6 (and their accompanying comb, bees and honey) are outstanding or upwardly projecting. As a result, then they can be more easily grasped by the attendant and removed from their chamber location.

Figure 4:
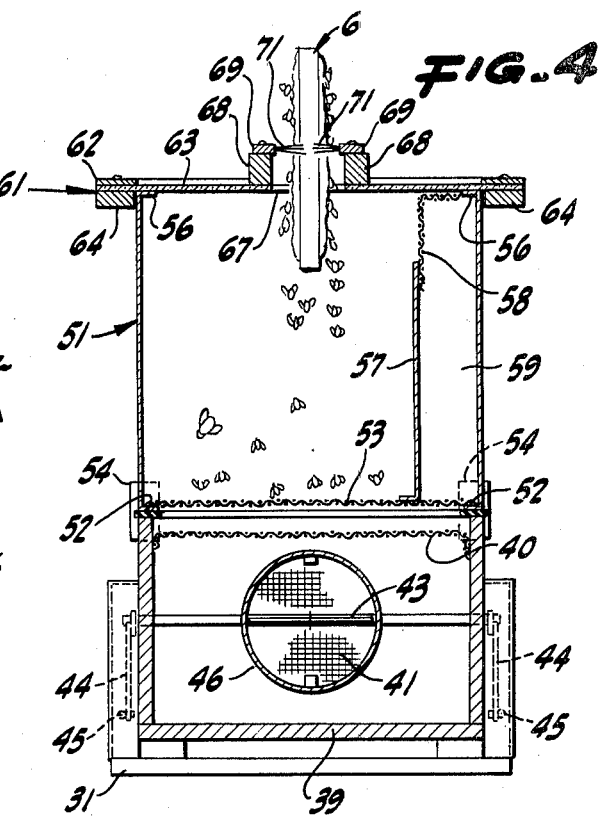
FIG. 4 is a cross-section, the plane of which is indicated by the line 4—4 of FIG. 2.

A removed comb frame 6 and attendant materials is then lowered, as shown in FIGS. 1 and 4, into a special treating arrangement. The particular device involved is a ground- or vehicular-supported framework 31 or platform having handles 32 for easy pickup and transport. The framework 31 carries a power source 33 such as the customary internal combustion engine. This is effective to drive a rotary suction device 34 having an air inlet 36 (FIG. 3) at one end and having a discharge to the atmosphere through an air outlet 37. The air intake 36 is joined to a collar 38 on a lowermost housing 39 also resting on the framework 31 and generally closed. But, at the top, the housing 39 is covered by a relatively coarse screen 40. Also, the housing 39 has an entrance screen 41 covering the entrance to an interior tube 42. Flow through the tube is controlled by a rotatable damper 43. The damper is moved by a linkage system 44 extending to a foot treadle 45. An operator, by depressing the treadle 45, can block flow through the entrance tube 42 or can permit flow therethrough in any desired amount up to and including a full amount.

Generally in line with the tube 42 and joined to the air inlet 36 is another duct 46. This is designed to transmit a reduced air pressure in the air inlet 36 to the interior of the enclosure 39. The layout is such that, when the damper 43 is open, atmospheric air can pass through the screen 41, through the tube 42, across a gap 47 between the tubes 42 and 46 and open to the lowermost housing, and then can flow through the tube 46 and the collar 36 and eventually return to the atmosphere through the discharge air outlet horn 37.

When the damper 43 is closed or it is in a position partially blocking flow through the tube 42, then a corresponding pressure exists within the entire housing 39 and is particularly effective through the screen 40.

Preferably seated on the housing 39 is a special, open-bottom vacuum chamber 51. While the vacuum chamber 51 is generally comparable to the other enclosures, such as 39, it preferably is of metal and has four solid sides. Inturned support flanges 52 support the chamber 51, preferably on a gasket or cushion, and also a screen or filter 53 extends entirely across the chamber bottom. The arrangement is such that guides 54 align and hold the vacuum chamber in position above the housing 39. Externally, the chamber has handles 55, while internally, at the top, the vacuum chamber 51 has inturned support flanges 56. Along at least one of the side walls, the chamber 51 is provided with a solid, interior partition 57 parallel to the side wall and extending from the bottom screen 53 up to a convenient point. The solid wall is continued by a screen 58 bent and joining the upper portion of the adjacent side wall and so defining a separate air flow channel 59.

For certain applications, the screen floor may be solid, thereby directing the downward air flow exclusively through one or more side wall channels generally of the same screen bottom design as the shown channel 59.

Adapted to rest on the flanges 56 of the vacuum chamber 51 is a cover plate 61. This is inclusive of a marginal frame 62 having fasteners passing through an optionally transparent top plate 63; for example, of "Plexiglas", and reinforced by side cleats 64. The plate 63 is continuous or solid, except that along the central portion of the device the plate is cut away to leave a generally rectangular, elongated opening 67. This is bounded on both sides and ends by upstanding walls 68 between them open to the atmosphere. Particularly pursuant to the invention, the upper portion of each of the walls 68 is augmented by a longitudinally extending brush 69 having its bristles 71 extending inwardly, leaving little or small space therebetween.

In the operation of this device, the engine 33 and suction device or blower 34 are put into operation. This reduces the pressure within the enclosure 39. Because of the communication through the screens 40 and 53, particularly when the damper 43 is closed, this causes a reduced pressure within the interior of the chamber 51. There is, however, air access to the chamber 51 through the spaces between and around the bristles 71 of the brushes 69 and then through the opening 67 into the chamber 51.

As indicated particularly in FIG. 1, a comb frame 6 containing honey and having bees thereon is removed from its chamber 17C, as shown in FIGS. 10, 11 and 12, and as a unit is gradually introduced into the vacuum chamber 51 by a lowering movement between the oppositely directed bristles 71 of the brushes 69. The effect or result is that many loose bees are readily dislodged and are immediately sucked downwardly into the interior of the chamber 51. Other bees that may be more firmly attached are nevertheless agitated or brushed by the bristles 71 and are thus detached so that they also are vacuumed through the opening 67 into the interior of the chamber 51.

The removed bees, however, cannot escape immediately from the vacuum chamber 51 because they are blocked by the screen 53 across the bottom and also by the screen 58 near the top. In addition, it is preferred to make the interior walls of the chamber smooth to facilitate making them quite slippery; for example, by application of a lubricant, so that the bees cannot rest or crawl thereupon.

After some operation, and after quite a number of different loaded comb frames have been introduced through the bristle structure, stripped of their bees and then withdrawn, there is a large population of bees within the interior of the vacuum chamber 51. Ordinarily, such a large population, by physically covering the screen, would tend to reduce the flow of air through the screen 53 to an undue extent. But because of the side channel 59 (or channels), the vacuum or air flow maintained within the vacuum chamber is always sufficient for all practical purposes. An adequate, low pressure is well sustained.

When the described vacuuming operation has been completed on the desired number of comb frames all from the same hive, several options are possible. If the objective is solely the removal of comb frames to facilitate the harvesting and extraction of honey, then the bees in the chamber 51 are returned to their hive by first removing the top plate 63, then removing the entire vacuum chamber 51 from its support, and inverting and lowering the inverted vacuum chamber immediately onto the vertically arrayed hive chamber or chambers, after the cover 19 has been removed, as shown in FIG. 13. When the vacuum chamber 51 is inverted, the bees theretofore confined therein are dislodged by gravity (and perhaps with some assisting means such as rapping) and enter into the hive chamber between the exposed comb frames therein, the bees being readily attracted thereto. After the chamber 51 is empty of bees, the hive cover 19 is replaced. The comb frames containing honey and substantially free of bees are placed in a separate chamber, similar or identical to the chamber 17C, for transport to honey extraction facilities.

Figure 5:
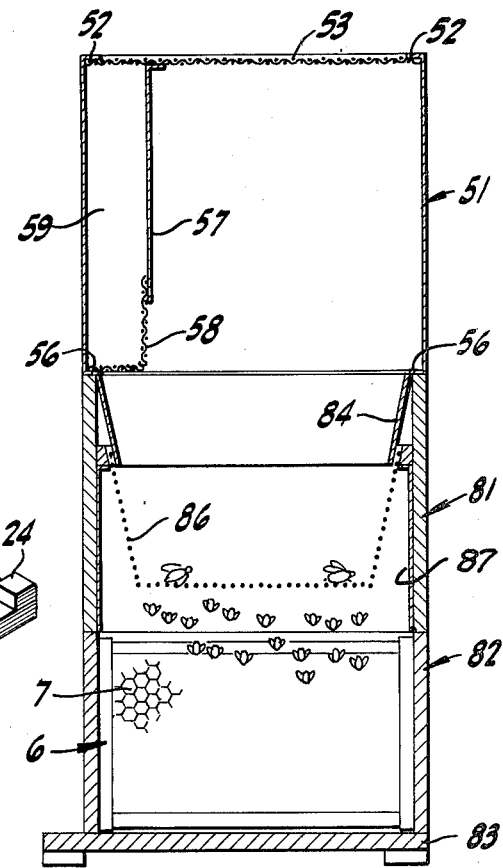
FIG. 5 is a cross-section, the plane of which is indicated by the line 5—5 of FIG. 13.

If the objective of the operation is to separate the queen and/or drones from the workers of a given hive (colony), then the bees that have been removed from the combs and accumulated in the vacuum chamber 51 are dislodged by the same, aforementioned procedure, except that the chamber 51 is inverted and lowered onto a filter chamber 81, as shown in FIG. 5, and dislodgment is by the previously described procedure.

The chamber 81 is open top and bottom and conveniently rests upon an open-top chamber 82 in turn resting upon a bottom board 83. Because all four walls of an entrance funnel 84 have a smooth and lubricated surface, bees are prevented from clinging to that slippery surface, and so fall from the vacuum chamber 51 into the filter chamber 81 onto a basin-shaped screen 86 comparable to a queen excluder. The openings of the screen 86, preferably made of parallel wires, are too small for queen and drone bees to pass through, but let the smaller worker bees pass through.

The walls 87 of the filter chamber 81 are also smooth and lubricated so bees cannot cluster or walk on their surfaces. The net result is that only the worker bees removed from the brood and/or honeycomb frames crawl and/or fall into a subjacent chamber 82, as shown in FIG. 5. The chamber 82 contains the comb frames from which all of the bees were previously vacuumed. The worker bees are highly attracted to the familiar combs and immediately take up positions on the vacuumed comb frames.

Passage of the worker bees through the screen 86 is accelerated by the intermittent introduction of smoke from a conventional bee smoker into the filter chamber. One side of the cover 19 is momentarily lifted a few inches while the smoke is puffed into the chamber, and then is lowered to close the filter chamber once again. Further acceleration of the passage of bees through the filter chamber 81 and the screen 86 is achieved by periodically lifting the filter chamber several inches above the support and sharply rapping it on the chamber 82 as the filter chamber 81 is returned to its original position on the chamber 82.

The result of the operation is that, within a short time period, there are left behind on the screen 86 one and sometimes additional separated queen bees and along with drone bees also. These bees can be removed for a different disposition by removal of the filter chamber 81 from the subjacent chamber 82.

Queens and drones, along with an insignificantly small number of workers that remain in the filter chamber 81 after the filtering process is completed, are available for disposal in various ways or by removing the filter chamber 81 from the chamber array, as shown in FIG. 13, and ejecting the bees into a four-sided collection chamber of the same overall dimensions as the chamber 82 but having a solid bottom, open top and all four walls covered with a smooth, lubricated surface that precludes walking or clustering by the bees. Ejection of bees from the filter chamber 81 is accomplished by inverting the filter chamber 81 and rapping it sharply on top of the collection chamber described above.

During the entire filtering operation, the chamber 82 can be positioned; for example, in an array like the chambers 17A, 17B and 17C, as shown in FIG. 9. The vacuum chamber 51 is again turned to the upright condition and is again placed on the lowermost housing 39, and the operation can be readily repeated.

If it is desired to collect worker bees for another purpose after they have descended through the filter chamber 81, then a four-sided chamber, of the same length and width dimensions as the chamber 82 and with a fine-mesh screen covering the bottom (to preclude the passage of worker bees), is inserted between the filter chamber 81 and the chamber 82. This causes the bees to collect in the inserted chamber as they descend. The inserted chamber and contained bees can then be removed, and the bees can be utilized; for example, by placing them in containers for shipment or for other disposition.

After the filtration process has been completed, the vacuum chamber 51 is again turned to its upright condition and is again placed on the lowermost housing 39, and the former operation can be repeated.

Since the operation is not usually of a continuous nature, but is somewhat intermittent, it is advisable, to reduce the load on the engine and for other reasons, for the operator to permit the spring-operated damper to open, as shown in FIG. 3, by releasing the foot treadle between the times the bees are being removed from the comb frames.

By the operation of the mechanism in the fashion disclosed, the bees on the opposite sides of a comb, and eventually of a plurality of combs and frames, are removed therefrom by a concomitant vacuuming and brushing operation and are thus transported to a zone in which there is a continuance of the vacuum, until such time as the relatively small-size worker bees are allowed to escape through a screen that restrains the queen bees and drones for separate disposition, that screening operation remaining optional and being used preferably where the partitioning of worker bees from queens and drones is required.

In the foregoing fashion, it is possible to reduce substantially the labor not only in removing bees from honeycombs prior to harvest and honey extraction, but also in removing bees from brood combs and separating the worker bees for subsequent use and for removing the queen and drone bees for a different disposition.

While much of the work is done by machinery, it is still true that there is followed a unique method for removing bees from the comb frames by subjecting the comb frames and bees to a vacuum air current and simultaneously subjecting them to brushing and so dislodging them to a different location whereat they are screen-separated by size (queen and drone distinguished from worker), the workers, alone, then being optionally reinstalled on the same or installed in different comb frames or otherwise disposed of, while the queens and drones are separately and otherwise disposed of.

We claim:

1. A device for removing bees from comb frames comprising a chamber having walls; means in one of said walls defining an elongated entrance opening of a configuration and size closely to receive the comb frame; vacuum means for subjecting the interior of said chamber to a subatmospheric pressure; and means for preventing the passage of bees from said chamber through said vacuum means, including a plate defining said entrance opening as a relatively narrow, elongated slot having substantially parallel sides, and in which said plate is supported by and removable from the top of said chamber.

2. A device for removing bees from comb frames comprising a chamber having walls; means in one of said walls defining an elongated entrance opening of a configuration and size closely to receive the comb frame; vacuum means for subjecting the interior of said chamber to a subatmospheric pressure; and means for preventing the passage of bees from said chamber through said vacuum means, including a plate defining said entrance opening as a relatively narrow, elongated slot having substantially parallel sides, in which said plate is supported by and removable from the top of said chamber, and in which at least a portion of said plate is transparent.

3. A device for removing bees from comb frames comprising a chamber having walls; means in one of said walls defining an elongated entrance opening of a configuration and size closely to receive the comb frame; vacuum means for subjecting the interior of said chamber to a subatmospheric pressure; means for preventing the passage of bees from said chamber through said vacuum means; means for supporting said chamber and in which said chamber is removably engageable with said supporting means; and queen separating means spanning said supporting means beneath said chamber, said queen separating means comprising a basin-shape screen having openings of a predetermined size large enough bodily to pass worker bees downwardly and small enough to block the passage of queen bees downwardly therethrough, and in which said supporting means is at least a partial enclosure having smooth walls extending above said screen and adapted to receive and carry a lubricant.

4. A device for removing bees from comb frames comprising a chamber having walls; means in one of said walls defining an elongated entrance opening of a configuration and size closely to reeceive the comb frame; vacuum means for subjecting the interior of said chamber to a subatmospheric pressure; means for preventing the passage of bees from said chamber through said vacuum means; means for supporting said chamber and in which said chamber is removably engageable with said supporting means; and queen separating means spanning said supporting means beneath said chamber, said queen separating means comprising a basin-shape screen having openings of a predetermined size large enough bodily to pass worker bees downwardly and small enough to block the passage of queen bees downwardly therethrough, and in which said supporting means is at least a partial enclosure having smooth walls extending above and below said screen and adapted to receive and carry a lubricant.

* * * * *